Jan. 23, 1940.  H. W. PFEFFER ET AL  2,188,206

APPARATUS FOR DUST COLLECTION

Filed July 21, 1937  6 Sheets-Sheet 1

Inventors
HENRY W. PFEFFER,
HARRY O. DANZ,
BY
Attorneys

Inventors
HENRY W. PFEFFER,
HARRY O. DANZ,

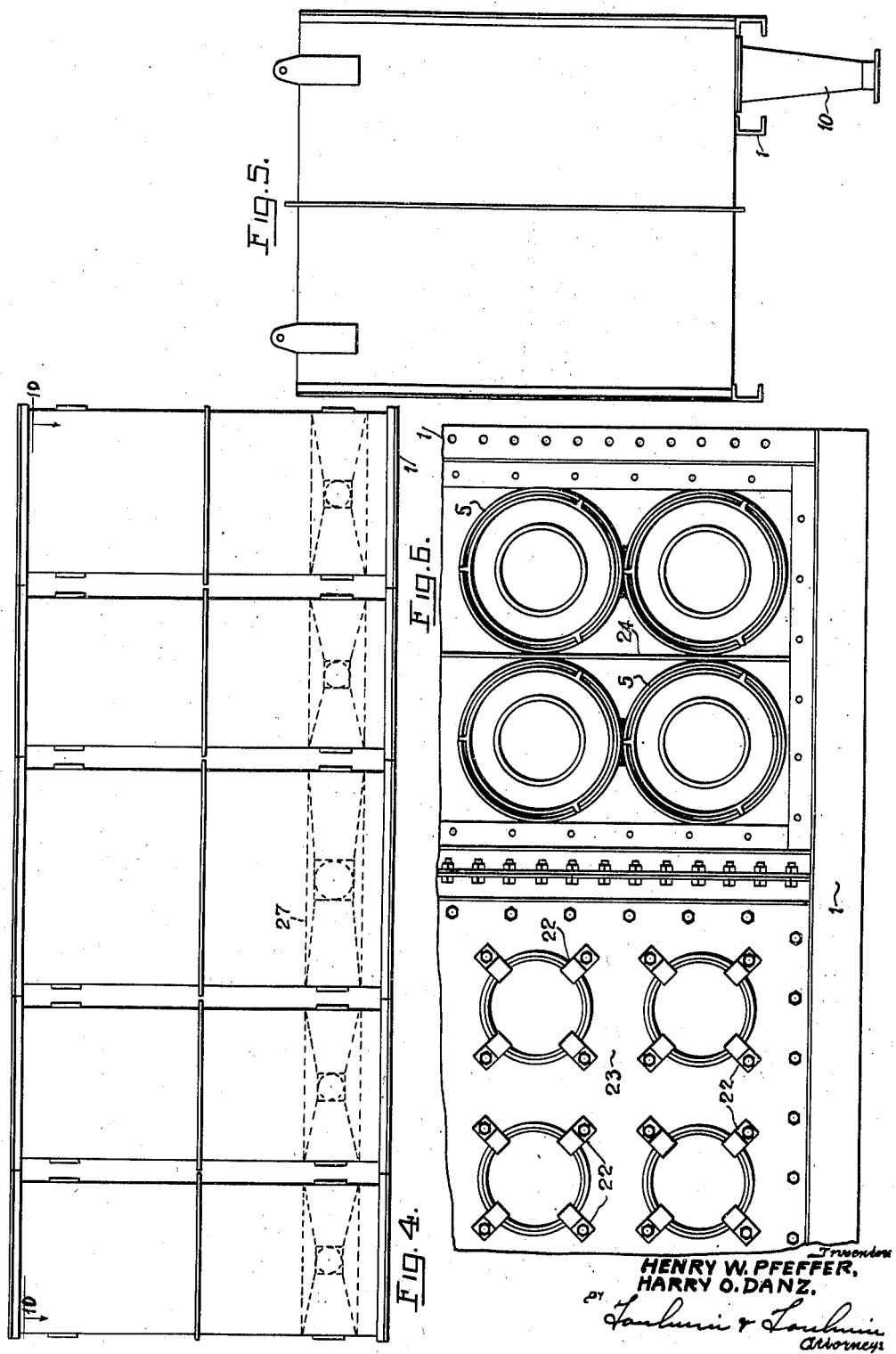

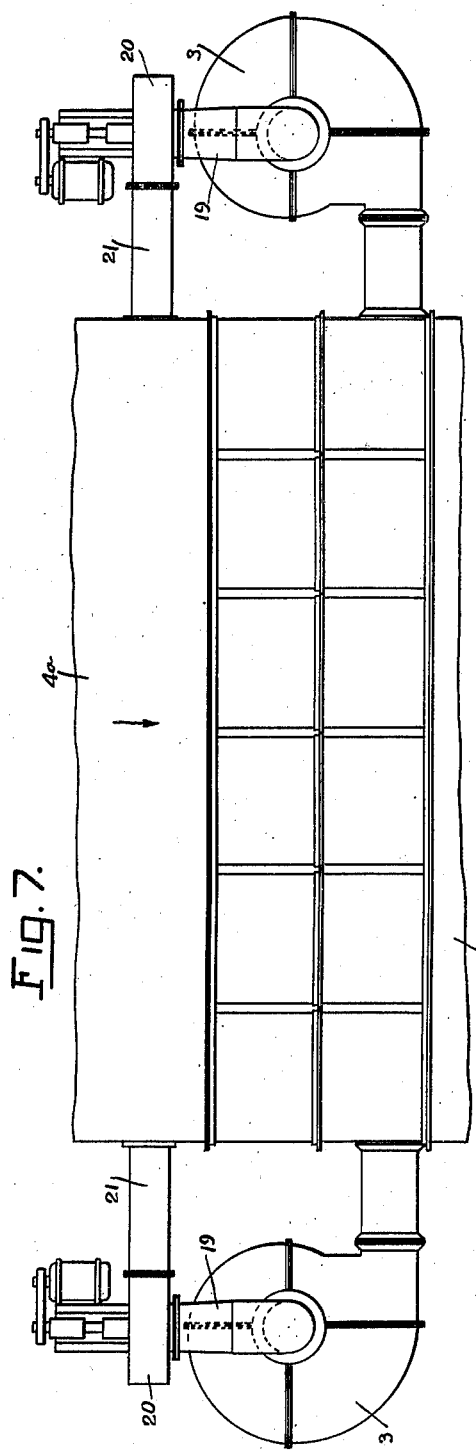
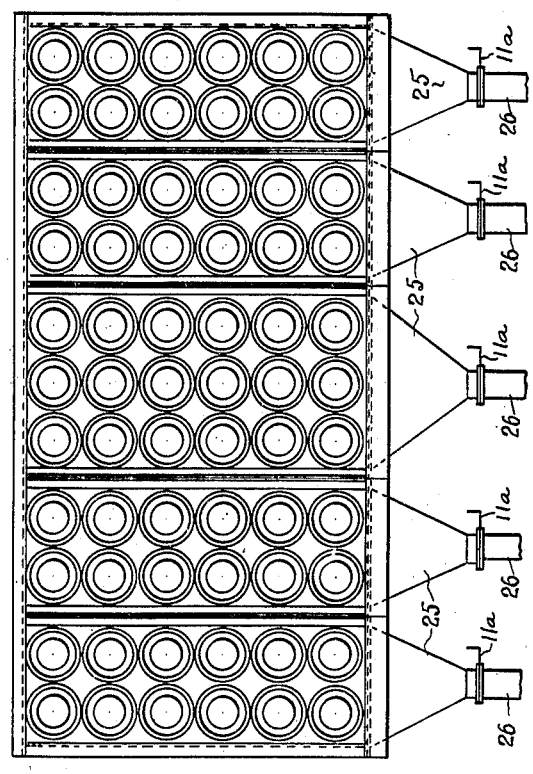

Patented Jan. 23, 1940

2,188,206

UNITED STATES PATENT OFFICE 2,188,206

APPARATUS FOR DUST COLLECTION

Henry W. Pfeffer, Philadelphia, Pa., and Harry O. Danz, Detroit, Mich., assignors to American Blower Corporation, Detroit, Mich., a corporation of Delaware Application July 21, 1937, Serial No. 155,404

6 Claims. (Cl. 183—34)

Our invention relates to dust collectors.

It is the object of our invention to provide a dust collector in which the dust-laden gas is passed through a plurality of passageways, and thereafter the independent streams of air so divided are subjected to helical motions to throw dust out centrifugally while the relatively dust-free air proceeds to its destination.

It is a further object to provide in such a connection means of independently controlling the removal of dust from groups of the independent air streams so as to adjust the collection action at different parts of the main dust-laden stream of gas.

It is a further object to provide secondary collectors adjustably connected to the main dust collector for extracting any entrained air with the dust from the main collector and returning the dust-free air into the main air stream.

Referring to the drawings.

Figure 1:
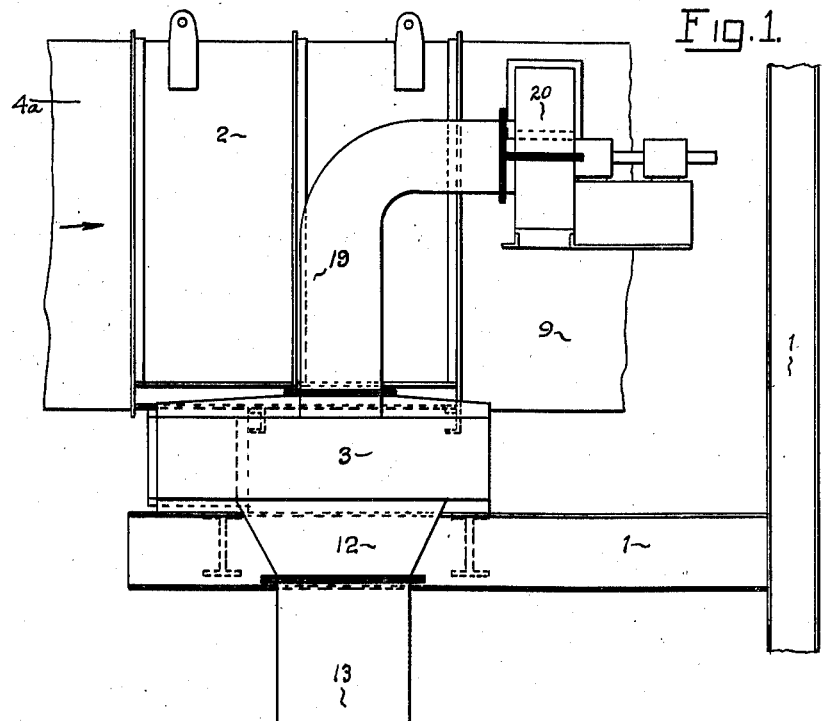
Figure 1 is a side elevation over one form of our dust collector showing a primary and a secondary collector.
Figure 2:
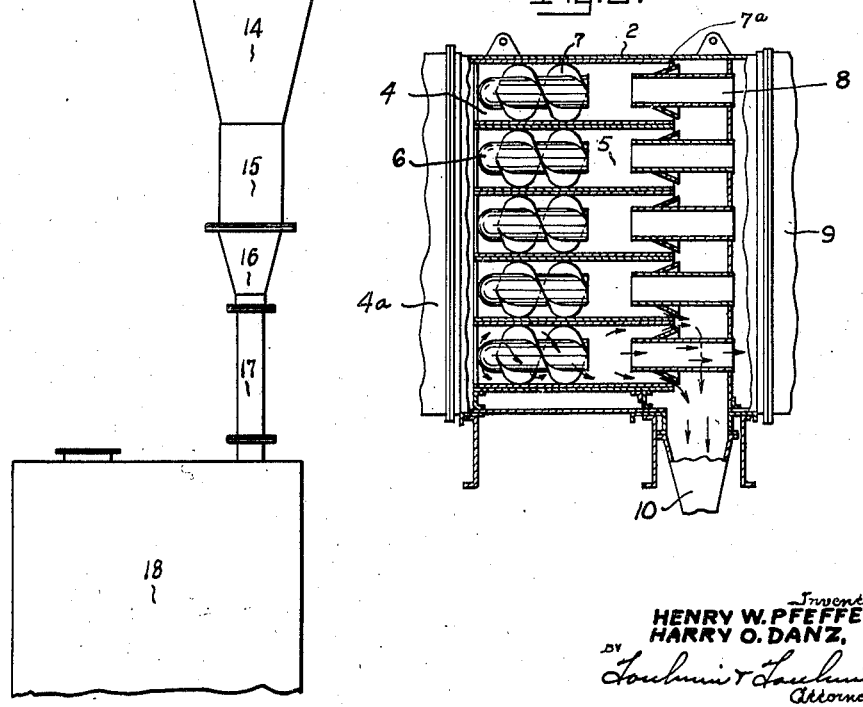
Figure 2 is a longitudinal section through the primary collector.
Figure 3:
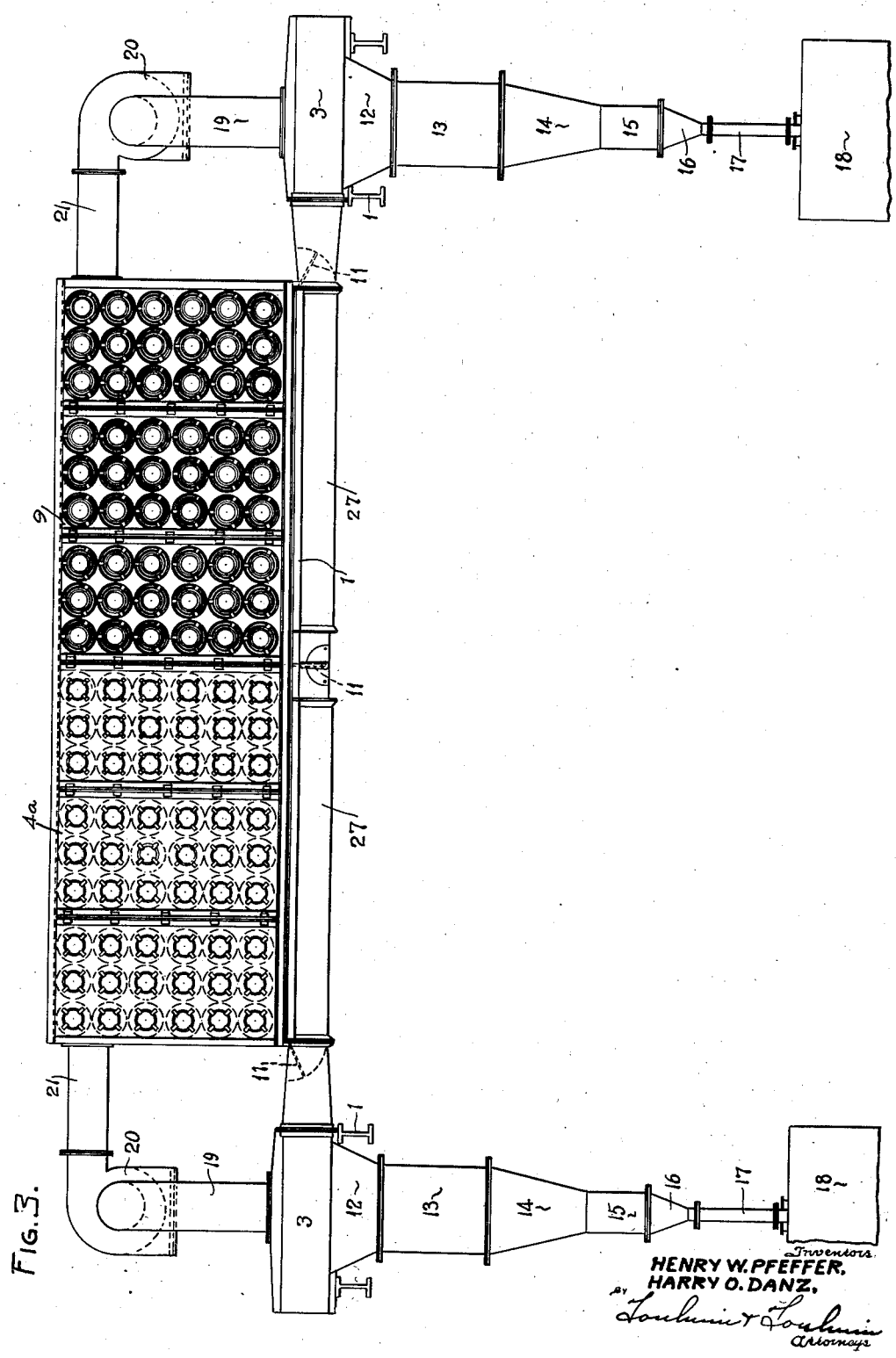

Figure 3 is a section on the line 3—3 of Figure 1 looking in the direction of the arrows. The right-hand group of discharge tubes has the cover plate removed and the left-hand group has the cover plate in place. This is viewing the primary dust collection tubes from the discharge end of the primary collector.

Figure 4 is a top plan view of a modified form of the primary collector.

Figure 5 is a side elevation thereof.

Figure 6 is a detailed rear elevation of the primary collector tubes with the back plate removed on the right-hand group and the back plate in position on the left-hand group.

Figure 7 is a top plan view of Figure 3.

Figure 8 is a rear elevation of the primary collector showing the independent hoppers for the collection of dust in the modified form.

Figure 9:
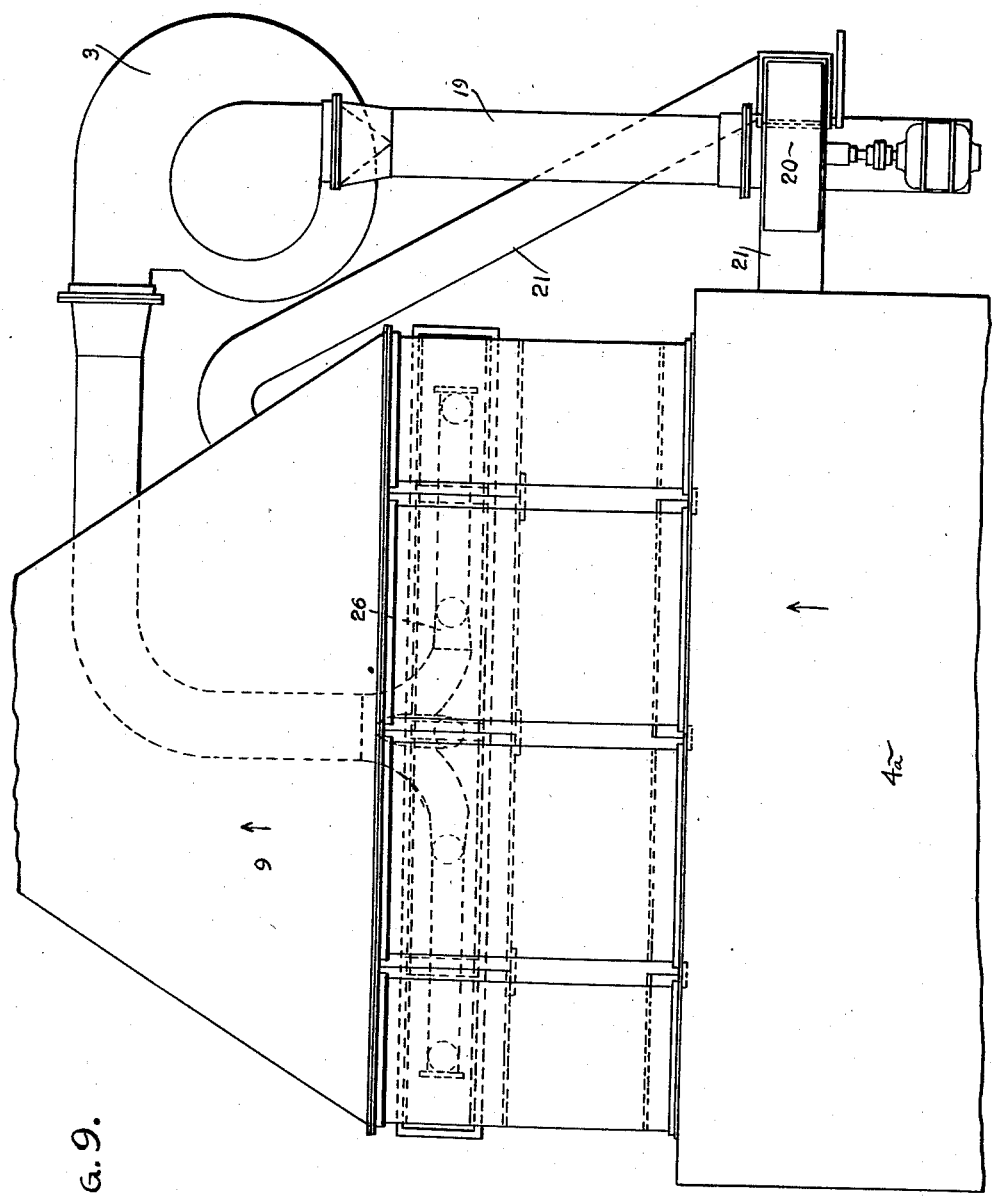

Figure 9 is a top plan view of this modified form.

Figure 10:
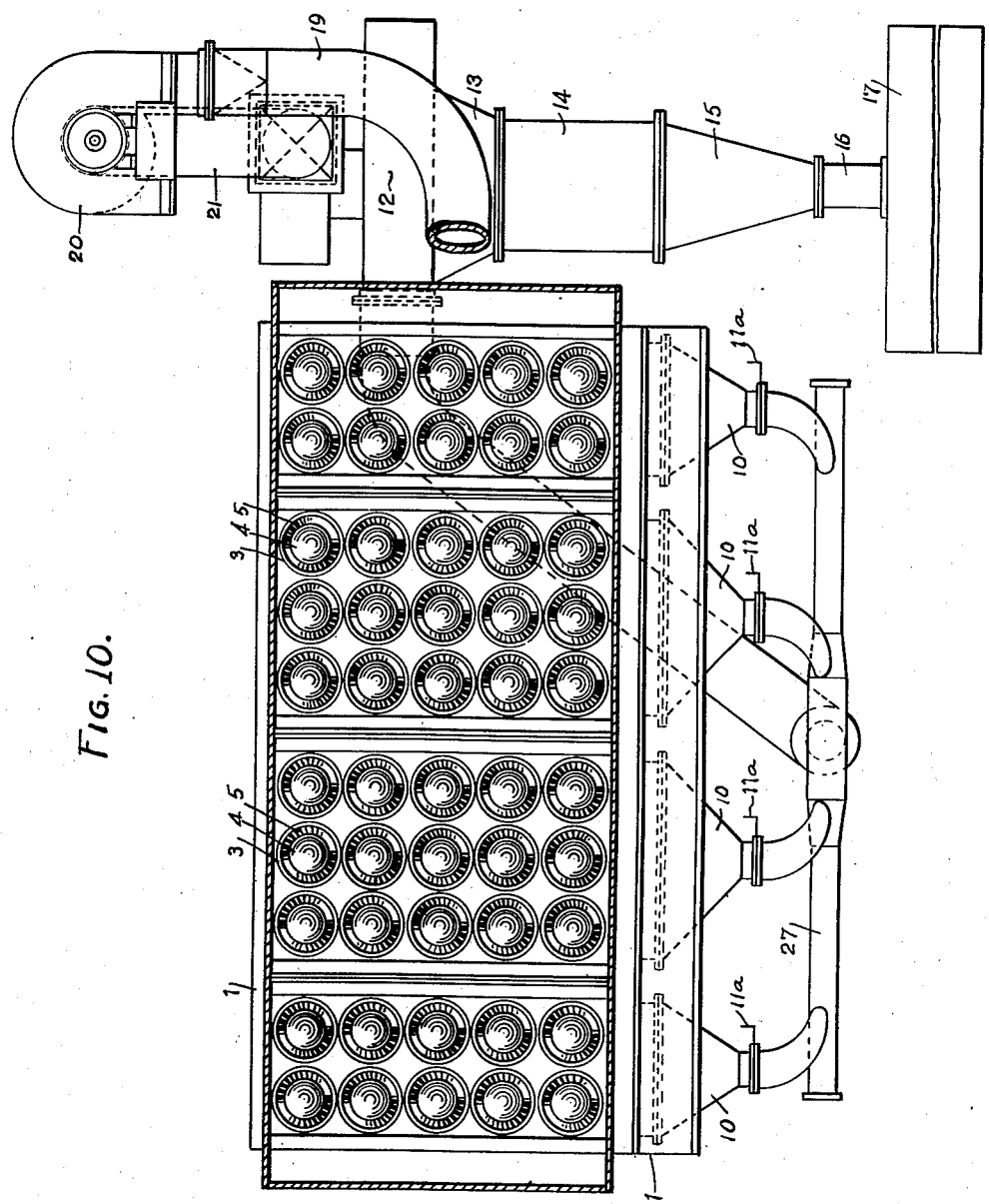

Figure 10 is a view taken on the line 10—10 of Figure 4 looking at the inlet ends of the independent spiral dust collectors of the primary dust collector.

In a system which employs a number of primary separators or separator sections located in a main passageway for incoming dust laden gas, where the gas is subjected to a primary separation of the dust therefrom, some of the separator sections are always located in an unfavorable position as to the gas inlets than others. This would cause more gas to flow through some of the separator sections, or parts of them, and more gas to flow through with the dust into the dust receiving chamber and secondary dust collector system. This would prevent certain of the collector sections or parts of them, from passing as much gas with the separated dust, and in some cases even cause a back flow of fluent or concentrate from the dust chamber, the fluent dust passing with the gas back into the clean gas stream of the separator sections of the primary separator. This is particularly true where the primary separator sections each contain a number of separator tubes.

It has been found that when a plurality of dust separator primary sections are used, particularly where said sections contain a large number of individual tubes, that by providing a separate duct from the exit end of each primary separator section to the secondary, and providing a damper means in each duct means, that the flow from the several sections may be so regulated that there will be no back flow of fluent dust from the exit end of the primary separator sections back into the main passageway in front of clean gas outlets. In other words, by partially closing off (or regulating) the fluent dust from the most advantageously located primary sections and permitting the fluent dust from other less advantageously located primary sections to pass freely to the secondary separator, it has been found that the gas will flow through all primary sections in substantially the same volume and thus improve performance.

Referring to the drawings in detail, I designates the structural frame members of a support for the dust collecting mechanism. This mechanism consists of a primary collector generally designated 2 and one or more secondary collectors generally designated 3. The dust is introduced through the inlet passageway 4a where it is divided into a plurality of streams passing through the tubes 5. These streams are split by the conical members 6 which have on the exterior helical vanes 7 for throwing the dust-laden air, particularly the dust, outwardly against the inner wall of the tube 5. The dust passes through the skimmer openings 7a hereinafter referred to as the concentrate outlet while the dust-free air passes through the exit opening 8 into the exit line 9. The dust so skimmed is associated with a limited amount of air and passes through the ducts or hoppers 10 which are controlled by slides or valves 11 into the vortex chambers of the secondary dust collectors 3, whence the dust descends through the depending collector shells 12, 13, 14, 15, 16 and 17 to the dust chamber 18. The air which is substantially free of dust passes upwardly through the pipe 19 to the fan 20 and is delivered to the pipe 21 either through the outlet or inlet side of the main passageways 4a and 9. It is obvious that the vertical pipe 19, due to gravity effect, causes a still further separation of whatever dust remains in the air so that the latter which is delivered to either side of the primary collector is entirely free of dust.

Where necessary, a series of dampers 11 (Figure 3) is used to control the secondary collection of the dust-laden gases and also can control the evacuation of dust from the primary dust collector units.

The ends of the tubes 5 have connected thereto by the clips 22 a back plate 23. The space between these tubes is separated by vertical partition plates 24.

In Figures 4, 5 and 8 in the modified form shown, the dampers 11 are at the bottom of hoppers 25 communicating with the pipes 26 whereas the form in Figure 3 is provided with a transverse trough 27 in which are located at intervals the dampers 11 at the center and at either end. Thus it is possible to control the secondary collection and the evacuation of the dust from the primary collector.

In Figure 9 is shown the top plan view of the piping system connected to the bottom of the several pipes 26, which pipes enter the volute casing of the secondary collector 3 in the manner heretofore described.

It will be understood that we desire to comprehend within our invention such modifications as may be clearly embraced within the claims and scope of our invention.

Having thus fully described our invention, what we claim as new and desire to secure by Letters Patent, is:

1. In a dust collecting system having a main passageway for the flow of gas, a primary separator comprising a plurality of sections in said passageway, each of said separator sections having means for conveying away purified air, a concentrate outlet for the fluent dust connected to the outlet end of each separator section, a secondary separator, a duct connecting the concentrate outlet of each primary separator section to said secondary separator, means for returning purified gases from said secondary separator to said main passageway; said system characterized by the provision of a separate means located in each duct between the concentrate outlet of each primary separator section and said secondary separator for regulating the amount of fluent dust passing from each primary separator section to said secondary separator.

2. In a dust collecting system having a main passageway for the flow of gas, a primary separator comprising a plurality of sections in said passageway, each of said sections having means for conveying away purified air, a concentrate outlet for the fluent dust connected to the outlet end of each section, a secondary separator, a duct connecting the concentrate outlet of each primary separator section to said secondary separator, means for returning purified gases from said secondary separator to said main passageway; said system characterized by the provision of a separate means located in said duct between the concentrate outlet of each primary separator section and said secondary separator for regulating the amount of fluent dust passing from each primary separator section to said secondary separator, and each primary separator section containing a plurality of individual tubular separators located therein.

3. In a dust collecting system having a main passageway for the flow of gas, a primary separator comprising a plurality of sections in said passageway, each of said sections having means for conveying away purified air, a concentrate outlet for the fluent dust connected to the outlet end of each separator section, a secondary separator, a duct connecting the concentrate outlet of each primary separator section to said secondary separator, means for returning purified gases from said secondary separator to said main passageway; said system characterized by a separate damper located in each duct between each primary separator section and said secondary separator.

4. In a dust collecting system having a main passageway for the flow of gas, a primary separator comprising a plurality of sections in said passageway, each of said sections having means for conveying away purified air, a concentrate outlet for the fluent dust connected to the outlet end of each separator section, a secondary separator, a duct connecting the concentrate outlet of each primary separator section to said secondary separator, means for returning purified gases from said secondary separator to said main passageway; said system characterized by the provision of a separate damper located in each of said ducts between the concentrate outlet of each primary separator section and said secondary separator for regulating the amount of fluent dust passing to said secondary separator, said system being further characterized by the provision of a plurality of individual tubular centrifugal separating means located within each separator section.

5. In a dust collecting system having a main passageway for the flow of gas, a primary separator comprising a plurality of sections in said passageway, each of said separator sections having means for conveying away purified air, a concentrate outlet for the fluent dust connected to the outlet end of each separator section, a secondary separator, a duct connecting the concentrate outlet of each primary separator section to said secondary separator, means for returning purified gases from said secondary separator to said main passageway; said system characterized by the provision of a separate damper located between the concentrate outlet of each primary separator section and said secondary separator for regulating the amount of fluent dust passing to said secondary separator, said system being further characterized by the provision of a plurality of individual tubular centrifugal separating means located within each separator section.

6. In a dust collecting system having a main passageway for the flow of gas, a primary separator inserted in said main passageway, said primary separator having means to purify the gas by concentrating the dust in a small portion of the gas, said means comprising a plurality of separating units arranged in a bank transversely of the flow of the gas stream, concentrate outlets from the primary separator for the fluent dust, a secondary dust separator, a passage for conducting the air from which the concentrated dust has been removed from the secondary collector to the main gas passageway; said system characterized by the provision of a plurality of partitions separating the bank of separators of the primary separators into separate groups of separators, and further characterized by the provision of separate passageway means connected to the concentrate outlets from each group of separators located between each pair of partitions to said secondary dust separator, each of said passageway means having a separate means for regulating the amount of fluent dust passing through said passageway means.

HENRY W. PFEFFER.
HARRY O. DANZ.